June 6, 1939. T. BERBELES 2,160,953
ROTARY MEAT-ROASTING MACHINE
Filed Sept. 21, 1937 2 Sheets-Sheet 2
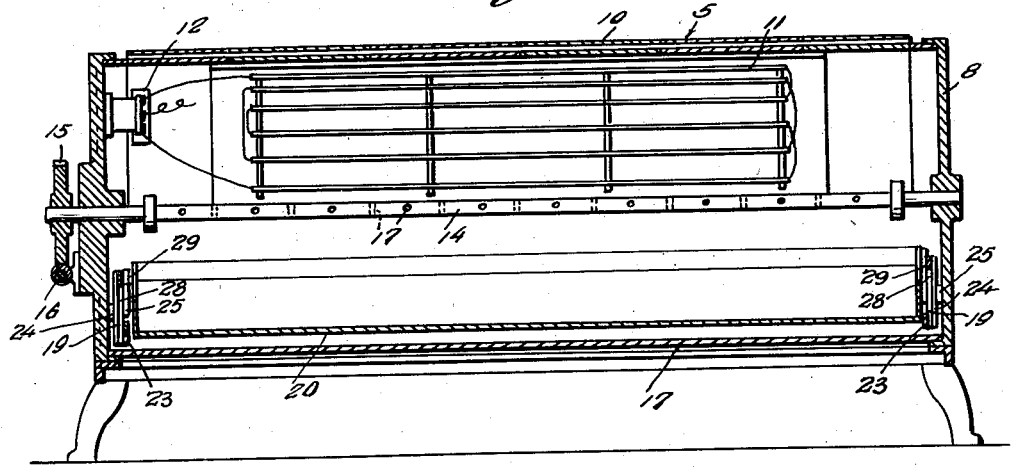
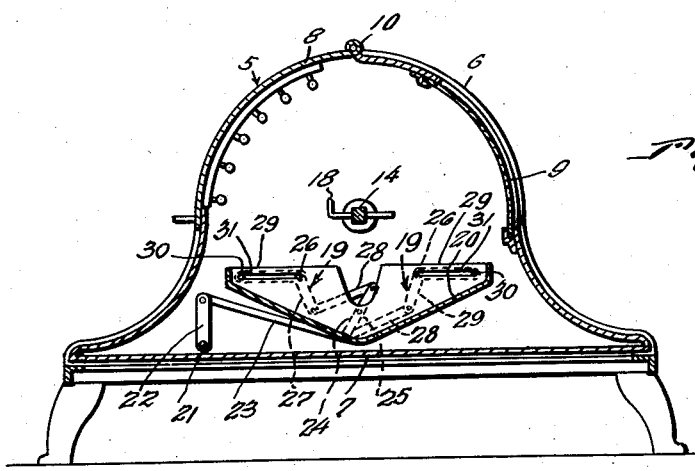
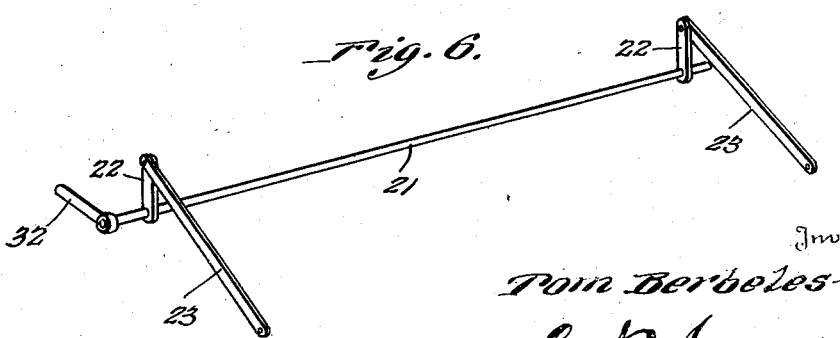

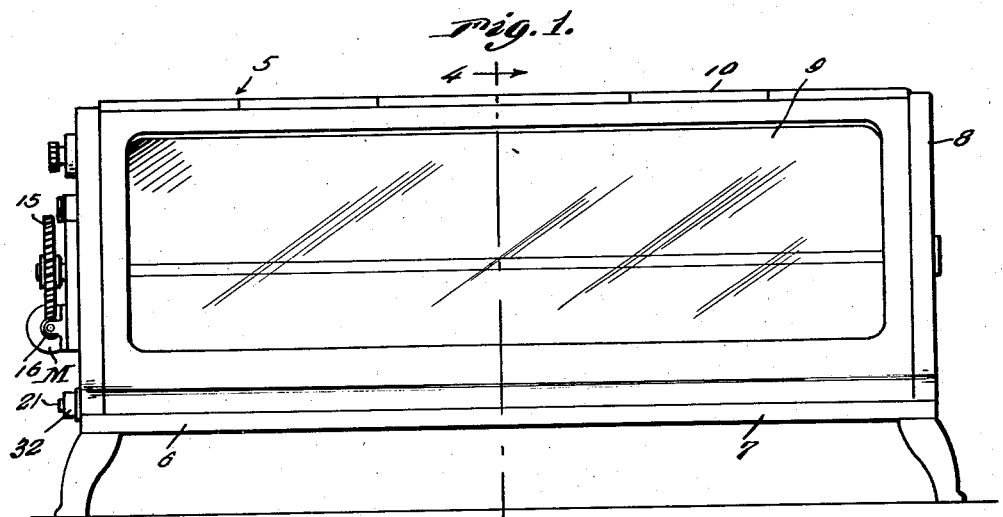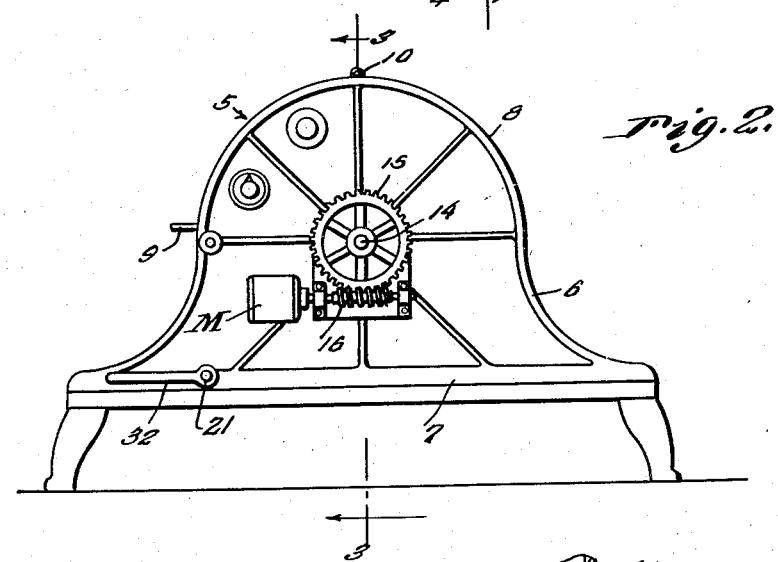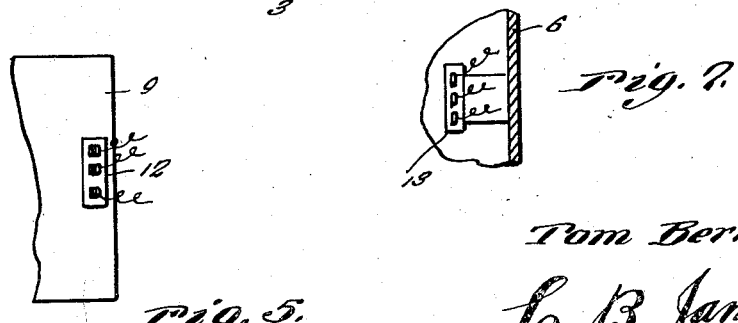

Patented June 6, 1939

2,160,953

UNITED STATES PATENT OFFICE 2,160,953

ROTARY MEAT-ROASTING MACHINE

Tom Berbeles, Canton, Ohio

Application September 21, 1937, Serial No. 164,953

1 Claim. (Cl. 53—5)

This invention relates to roasting machines and more particularly to rotary roasting machines.

The primary object of this invention resides in a rotary roasting machine adapted to roast meats, fowls, etc.

Another object of this invention resides in the provision of an air-tight roasting machine of such construction that the meat, fowl, etc., therein is basted without exposing the same to the atmosphere.

A further object of this invention resides in the provision of an air tight roasting machine of such construction that the meat, fowl, etc., therein is rotated at a predetermined speed in the region of a heating element where it can be basted at the will of the attendant without opening the door.

A still further object of this invention resides in the provision of a meat roasting machine of such construction that the heating means thereof is rendered inoperative upon opening the door thereof.

Aside from the aforesaid objects this invention resides in the provision of a rotary meat roasting machine having a particularly constructed basting element disposed relative to the heating element and meat supporting element thereof so as to baste the meat with grease or the like regardless of its size.

Among the many objects of this invention is the provision of an air-tight meat roasting machine of such construction that the attendant thereto can not only observe the meat while cooking but can operate the baster thereof without interfering with the operation of the machine.

With these and other objects in view this invention resides in certain novel features of construction to be hereinafter more particularly set forth in the specification, illustrated in the accompanying drawings and pointed out in the appended claim and, while this disclosure depicts my present conception of the invention, the right is reserved to resort to such changes in construction and arrangement of elements as come within the scope of the claim.

In the accompanying drawings forming a part of this application:

Fig. 1 is a front view of a meat roasting machine as constructed in accordance with this invention.

Fig. 2 is an end view thereof.

Fig. 3 is a longitudinal sectional view thereof approximately on line 3—3 of Fig. 2.

Fig. 4 is a vertical cross sectional view of the roasting machine approximately on line 4—4 of Fig. 1.

Fig. 5 is a detail view of a portion of the door showing the male member of the electricity coupling.

Fig. 6 is a detail perspective view of the basting trough operating lever.

Fig. 7 is a detail view of the female member of the electricity coupling.

In the present embodiment of this invention the numeral 5 designates, in general, a meat roasting machine which consists of a casing 6 preferably having a flat base 7 and a substantially semi-cylindrical hood 8 which is provided with a glass paneled door 9 hingedly connected to the hood 8 as at 10 and carrying an electric heating element 11, the terminals of which are connected to a male electricity coupling 12 adapted to engage a female electricity coupling 13 secured to the hood, when the door is in closed position, said female coupling is connected to a source of electricity by an electricity conduit (not shown).

Extending longitudinally across and journaled at the ends of the hood 8 is a rotatable shaft 14 having one end thereof projecting through the end of the hood to accommodate a gear 15 connected to an electric motor M through the instrumentality of a worm gear 16 and, while this mechanism is herein utilized to operate the shaft 14, it is within the purview of this invention to substitute other power transmitting means therefor.

The shaft 14 is preferably provided with a series of apertures 17 therein which are adapted to accommodate a spike 18 or the like so as to fasten a piece of meat, etc., thereon.

Suspended for perpendicular movement within the casing, preferably adjacent the base 7 is a combined grease drip pan and basting trough 20. In order to move this trough 20 vertically there is provided a crank shaft 21 which extends from front to rear of the casing and adjacent each end of this crank shaft is a rock arm 22. The free end of each rock arm is connected by a link 23 with the lower end of a lever 24 pivoted to the casing intermediate its ends as at 25. At 19 is a pair of bent levers which are pivotally connected at their angles to the casing as indicated at 26. One arm 27 of each of the levers 19 depends from its pivot 26 and is connected by a link 28 with a respective arm of the lever 24. The other arm 29 of each lever 19 carries a pin 30 which engages a slot 31 formed in the end wall of the trough 20. The arms 29 of the levers 19 project away from the center in the lowered position of the trough 20 and the pins 30 on these arms lie in the outer ends of the slots 31 as shown in Fig. 4. When, however, the rock shaft 21 is rotated, as by handle 32 on the exterior of the casing, the lever 24 will be rocked which in turn will swing the levers 19 so that the arms 27 move away from each other and the pins 30 move inwardly of the slots 31. Thus the trough 20 can be raised or lowered at will.

In that machines of this character must necessarily function under predetermined temperatures, suitable electrical heat controlling and regulating elements are included in the electricity circuit thereof, the same while being of material benefit in the operation of this machine, are not specifically referred to on account of their general use.

With this invention fully set forth it is apparent that an air-tight rotary roasting machine for meats, etc., is provided and, through the instrumentality of the particular basting means disposed in the region of the meat supporting and rotating shaft, the meat may be basted by the attendant without opening the door.

Having thus fully described my invention what I claim and desire to protect by Letters Patent is:

In a basting oven, a casing, a basting trough normally positioned within said casing at the bottom thereof, a rock shaft extending through the casing parallel to said basting trough, rock arms on the shaft each adjacent a respective side of the casing, links pivotally connected to the free ends of said rock arms, a lever at each end of the trough and pivoted intermediate its ends to the casing, a pair of levers at each end of the trough, each having a normally horizontal arm and a normally depending arm, the levers of said pairs being pivoted at the junction of their arms to the casing, links connecting respective ends of the first levers to the ends of the depending arms of the pairs of levers, said trough having end walls provided with horizontal slots, pins at the ends of the horizontal arms of the bent levers projecting into said slots and normally positioned at the outer ends of the slots, the pivotal axes of the bent levers being normally adjacent the inner ends of said slots, and means exterior of the casing secured to the rock shaft for rotating the latter.

TOM BERBELES.